(12) United States Patent
Chaki et al.

(10) Patent No.: US 8,644,616 B2
(45) Date of Patent: *Feb. 4, 2014

(54) CHARACTER RECOGNITION

(71) Applicants: Nabendu Chaki, Kolkata (IN); Soharab Hossain Shaikh, Kolkata (IN)

(72) Inventors: Nabendu Chaki, Kolkata (IN); Soharab Hossain Shaikh, Kolkata (IN)

(73) Assignee: University of Calcutta, West Bengal (IN)

( * ) Notice: Subject to any disclaimer, the term of this patent is extended or adjusted under 35 U.S.C. 154(b) by 0 days.

This patent is subject to a terminal disclaimer.

(21) Appl. No.: 13/755,728

(22) Filed: Jan. 31, 2013

(65) Prior Publication Data

US 2013/0208986 A1 Aug. 15, 2013

Related U.S. Application Data

(63) Continuation of application No. 12/756,612, filed on Apr. 8, 2010, now Pat. No. 8,391,602.

(51) Int. Cl.
*G06K 9/48* (2006.01)
(52) U.S. Cl.
USPC .......................... 382/197; 382/177; 382/179
(58) Field of Classification Search
USPC ......... 382/173, 177, 178, 179, 186, 119, 228, 382/218, 196, 138, 197, E7.133; 324/452, 324/457, 671; 340/5.52, 5.82
See application file for complete search history.

(56) References Cited

U.S. PATENT DOCUMENTS

| | | | | |
|---|---|---|---|---|
| 5,303,311 A * | 4/1994 | Epting et al. | .................. | 382/197 |
| 5,438,630 A * | 8/1995 | Chen et al. | .................... | 382/159 |
| 5,745,600 A * | 4/1998 | Chen et al. | .................... | 382/218 |
| 7,330,032 B2 * | 2/2008 | Donnangelo | ................. | 324/452 |
| 7,580,551 B1 * | 8/2009 | Srihari et al. | ................. | 382/115 |
| 7,620,244 B1 * | 11/2009 | Collier | ......................... | 382/186 |
| 8,126,270 B2 * | 2/2012 | Iinuma | ........................ | 382/178 |

OTHER PUBLICATIONS

Iwmura, M., et al., "Isolated character recognition by searching feature points," Proceedings, Eighth International Conference on Document Analysis and Recognition, vol. 2, pp. 1035-1039, Aug. 29-Sep. 1, 2005.
Zhang, X., et al., "Feature point method of Chinese character recognition and its application," Journal of Computer Science and Technology, vol. 5, No. 4, pp. 305-311, 1990.
Saeed et al., New Experiments on Word Recognition Without Segmentation, Advances in Information Processing and Protection, Springer US, 2008, Part-III, pp. 323-332.
Pal et al., Handwritten Bangla Compound Character Recognition Using Gradient Feature, 10th International Conference on Information Technology, 2007.
Majumdar, Bangia Basic Character Recognition Using Digital Curvelet Transform, Journal of Pattern Recognition research 1, vol. 17, No. 26, Mar. 30, 2007.
Haque et al., Automatic Detection and Translation of Bengali Text on Road Sign for Visually Impaired, Daffodil International University Journal of Science and Technology, vol. 2, Issue 2, Jul. 2007.

(Continued)

*Primary Examiner* — Anh Do
(74) *Attorney, Agent, or Firm* — Brundidge & Stanger, P.C.

(57) ABSTRACT

Systems and methods for character recognition by performing lateral view-based analysis on the character data and generating a feature vector based on the lateral view-based analysis.

20 Claims, 5 Drawing Sheets

(56) References Cited

OTHER PUBLICATIONS

Syeed et al., Bengali Character Recognition Using Bidirectional Associative Memories (BAM) Neural Network, ICCIT-2002, Dhaka, Dec. 27-28, 2002.

Tabedzki et al., A View-Based Toeplitz-Matrix-Supported System for Word Recognition without Segmentation, Proceedings of the Sixth International Conference on Inelligent Systems Design and Applications, Oct. 16-18, 2006.

Saeed et al., Cursive-Character Script Recognition Using Toeplitz Model and Neural Networks, 7th ICAISC—International Conference on Artificial Intelligence and Soft Computing, Jun. 7-11, Zakopane 2004.

Basu et al., Text Line Extraction from Multi-Skewed Handwritten Documents, Pattern Recognition 40, 2007, pp. 1825-1839.

Karim et al., A Modified Neural Network Learning Approach and its Application to Bengali Character Recognition, Malaysian Journal of Computer Science, vol. 11, No. 2, Dec. 1998, pp. 68-73.

Bhatiacharya et al., On Recognition of Handwritten Bangia Characters, ICVGIP 2006, LNCS 4338, pp. 817-828, 2006.

Brown, Character Recognition by Feature Point Extraction, 1992, obtained from uri: <http://www.ccs.neu.edu/home/feneric/charrec.html>.

Shaikh et al., A View-based Approach for Recognition of Bengali Printed Characters, Proceedings (IEEE CS CPS) of the 8th International Conference on Computer Information Systems and Industrial Management Applications (CISIM '09), Dec. 2009, ISBN: 978-1-4244-5612-3.

Saeed, Sound and Voice Verification and Identification a Brief Review of Toeplitz Approach, Vaclav Sna'el (Ed.): Znalosti 2008, pp. 22-27, ISBN 978-80-227-2827-0.

\* cited by examiner

| | |
|---|---|
| 201 | Choose initial threshold |
| 202 | Segment image |
| 203 | Compute average |
| 204 | Create new threshold |
| 205 | Iterate at step 202 |

Fig. 9

CHARACTER RECOGNITION

CROSS-REFERENCE TO RELATED APPLICATIONS

This application is a continuation of U.S. application Ser. No. 12/756,612, filed Apr. 8, 2010, U.S. Pat. No. 8,391,602.

BACKGROUND

Text recognition is known. The current state of the art generally is based on computational models and tools that work on the entire scanned text image stored in the system. That is, typically every scanned pixel of the text is used for text recognition. This typically requires a large amount of space for storage. Further, these methods are time consuming as computation and processing for character recognition and classification takes place using a large amount of data.

Automatic recognition of Asian characters may be a challenge. There have been some efforts to explore methods using top and bottom views of scanned text. However, these top and bottom methods have not been successful for many Asian languages that use 'Matra'. A Matra is a running horizontal line along the top of the characters. This horizontal line reduces the usefulness of the top view for character recognition of the text of many Asian languages. This is because the top view of many characters in these languages is exactly the same.

The Matra is prevalent and typical in many Asian languages, including Bengali, and Hindi, etc. Other languages for which character recognition is difficult include traditional Mongolian script and its offshoots like Manchu that are written vertically.

Other difficulties effecting the ability to correctly recognize even typed language symbols is the complex irregularity among the characters for different languages, fonts, styles and size. This irregularity widens when one deals with handwritten characters or widely varying fonts of a given language.

SUMMARY

The embodiments herein relate to a method comprising acquiring character data comprising one or more characters, the one or more characters having a first contour and a second contour, performing lateral view analysis on the character data, generating a feature vector based on the lateral view analysis, and identifying the one or more characters. In one aspect, performing lateral analysis comprises selecting a number of characteristic points, dividing the one or more characters into a number of horizontal segments, the number of segments equal to the number of characteristic points, and locating characteristic points on the first and second contours, wherein a characteristic point is located in each segment on both the first and second contours. In another aspect, an origin is located at a lower left of the one or more characters and wherein the characteristic points on the first contour are located at a minimum distance from a vertical axis rising from the origin and the characteristic points on the second contour are located at a maximum distance from the vertical axis.

In another aspect, the horizontal segments have the same height. In another aspect, the method further comprises binarizing the character data. In another aspect, the method further comprises removing noise from the character data. In another aspect, the method further comprises performing oblique/skew detection. In another aspect, the method further comprises segmenting the character data into individual characters, the character data comprising a plurality of characters. In another aspect, the contour data is not thinned. In another aspect, identifying the one or more characters comprises using an artificial neural network. In another aspect, the method is adapted to recognize cursive characters. In another aspect, the method is substantially font invariant. In another aspect, the method is configured to identify characters in fonts having variable character widths. In another aspect, the feature vector comprises the minimum distance of the characteristic points on the first contour, the maximum distances of the characteristic points on the second contour, the width of the character, and the height of the character.

Another embodiment relates to a system comprising a microprocessor and a memory, the memory comprising computer executable instructions for acquiring character data comprising one or more characters, the one or more characters having a first contour and a second contour, performing lateral view analysis on the character data, generating a feature vector based on the lateral view analysis, and identifying the one or more characters. In one aspect, the system further comprises a data acquisition device. In another aspect, the system further comprises computer executable instructions for binarizing the character data, removing noise from the character data, and performing oblique/skew detection. In another aspect, the system further comprises computer executable instructions for segmenting the character data into individual characters. In another aspect, the system further comprises computer executable instructions for identifying the one or more characters using an artificial neural network. In another aspect, the memory further comprises an artificial neural network.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Features of the invention are shown in the drawings, in which like reference numerals designate like elements.

DETAILED DESCRIPTION

Character recognition of Asian languages is difficult. Conventional character recognition methods typically involve computations using every pixel that comprise the character. A large amount of memory is typically used. Further, using all of the pixels consumes valuable processor time. An embodiment disclosed herein use a lateral approach (explained in more detail below) to character recognition. The lateral approach does not need to use all of the pixels in a character. Indeed, as discussed below, acceptable character recognition may be performed with relatively few, representative data points.

An example character recognition method is substantially font invariant, fast, yet accurate. That is, the method works with a wide range of fonts for a given language—fonts which share the same basic contour (radically decorative fonts pose recognition problems). Further, the method is not restricted to any particular language or script. The method has been tested with Indian characters such as Bengali and Hindi, however it may be used with any number of languages. Indeed, the method can easily be extended for the recognition of essentially any character in any script.

In contrast to conventional methods, an example embodiment of the method uses a lateral-view based methodology for character recognition. The lateral-view method uses data from the left and right contours of the character. Experimental results have shown that correct character recognition can be accomplished with only partial information about the shape of the character. Characteristic points may be extracted from the left and right contours of the individual letters to form a characteristic feature vector. In an embodiment, the vector may be feed into an Artificial Neural Network for classification/identification.

An embodiment relates to handwritten text recognition in handheld devices such as but not limited to mobile phones, laptops, pdas, and mobile internet devices. This embodiment uses fewer resources in terms of computation time and memory relative to conventional methods of handwritten text recognition. This embodiment is handy for mobile devices in which computations are typically made in a resource constrained environment. Because the present methods typically use only a small number of representative points, the technique reduces storage used for character recognition. For example, after the characteristic vectors are generated, the original character image may be discarded. Reproduction of the original text can be made from the character vectors as desired. Additionally, as discussed in more detail below, embodiments of the method may be used for recognition of compound characters prevalent in Bengali or Hindi type Asian languages.

Figure 1:
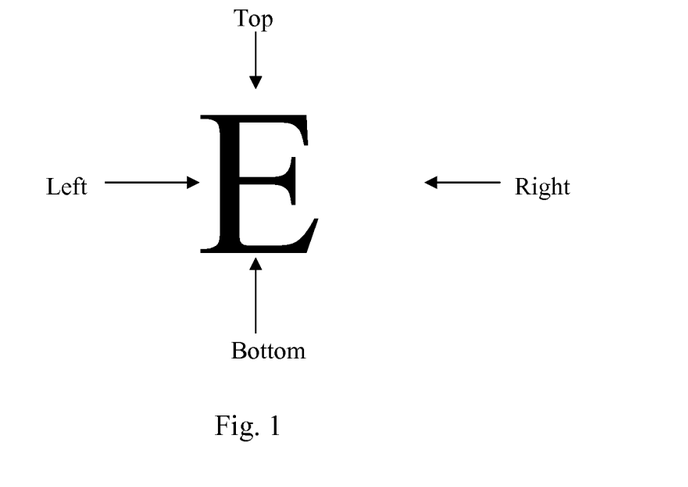
FIG. 1 is a schematic illustration defining four view directions: top, bottom, left, and right.

As used herein the term "view" refers to a set of points from an outer contour of a character taken from a defined direction. Views may be taken from any number of different defined directions. Generally, four views are defined: top, bottom, left, and right. The four views are illustrated in FIG. 1 with reference to a capital letter "E." The "top view" uses select points from the top contour of the character. The "bottom view" uses select points from the bottom contour of the character. The "left view" uses select points from the left contour of the character, while the "right view" uses select points from the right contour of the character. The phrase "lateral view" refers to both the left and right views. That is, both the left and right views are lateral views.

Figure 2:
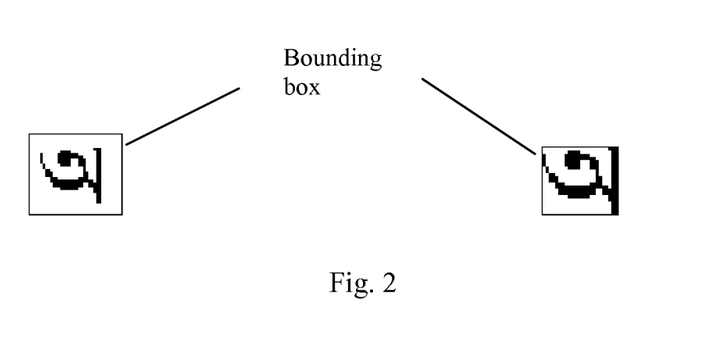
FIG. 2 is a schematic illustration of an example application of a bounding box.
Figure 8:
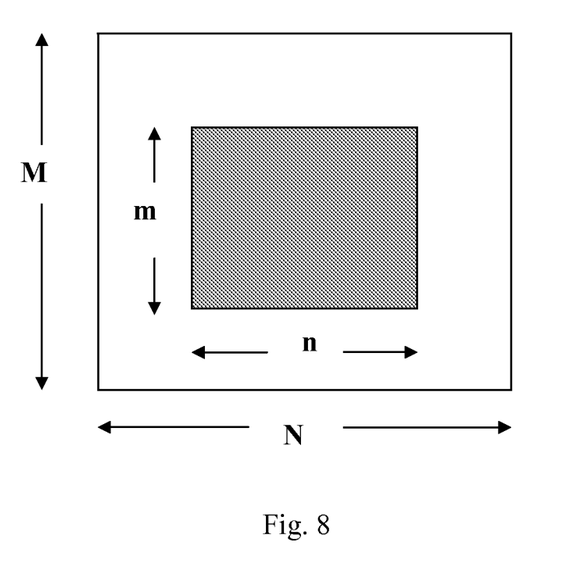
FIG. 8 illustrates an example use of a bounding box.

A "bounding box" is an expression of the maximum extents of a 2-dimensional object (e.g. character) within a 2 dimensional (x, y) coordinate system, in other words min(x), max(x), min(y), max(y). The bounding box may be used as an indicator of the relative positions of a feature of a character. Each character within a given language may have a unique bounding box. Alternatively, the size of the bounding box may be fixed (e.g., m×n) and the characters resized to fit the bounding box. FIG. 2 illustrates an example of the letter "Auo" from the Bengali language surrounded by a bounding box, while FIG. 8 illustrates how the bounding box concept is used. An M×N background image is created. After putting the image into an m×n bounding box, the m×n bounding box is superimposed on the M×N background as shown in FIG. 8. Typically, m<M and n<N. The character may need to be scaled to fit into the m×n box. The M×N character is the final image on which the view-based analysis is applied. The size of M×N and m×n boxes typically varies with the language being recognized.

"Binarization" is the process of converting a scanned image having multiple colors (e.g., grey scale to full color) to a black-and-white format. "Noise" may include, but is not limited to, smudges, spots, dirt, and other artifacts which are not intended to be part of the character data. "Thinning" is a process by which a character is reduced to a skeleton by successively stripping away outer boundary pixels. "Skew" is a measure of angular misorientation of text from parallel for languages that are written horizontally.

"Segmentation" is a process by which text is divided into individual characters. The goal of segmentation is to simplify and/or change the representation of an image into something that is more meaningful and easier to analyze. Image segmentation is typically used to locate objects and boundaries (lines, curves, etc.) in images. As discussed in more detail below, segmentation may be performed in a series of steps. That is, a page of text may be segmented into paragraphs, paragraphs into sentences, sentences into words, and words into characters. Segmentation, however, need not be performed using all of the previous steps. That is, one or more of the steps may be omitted.

Figure 3:
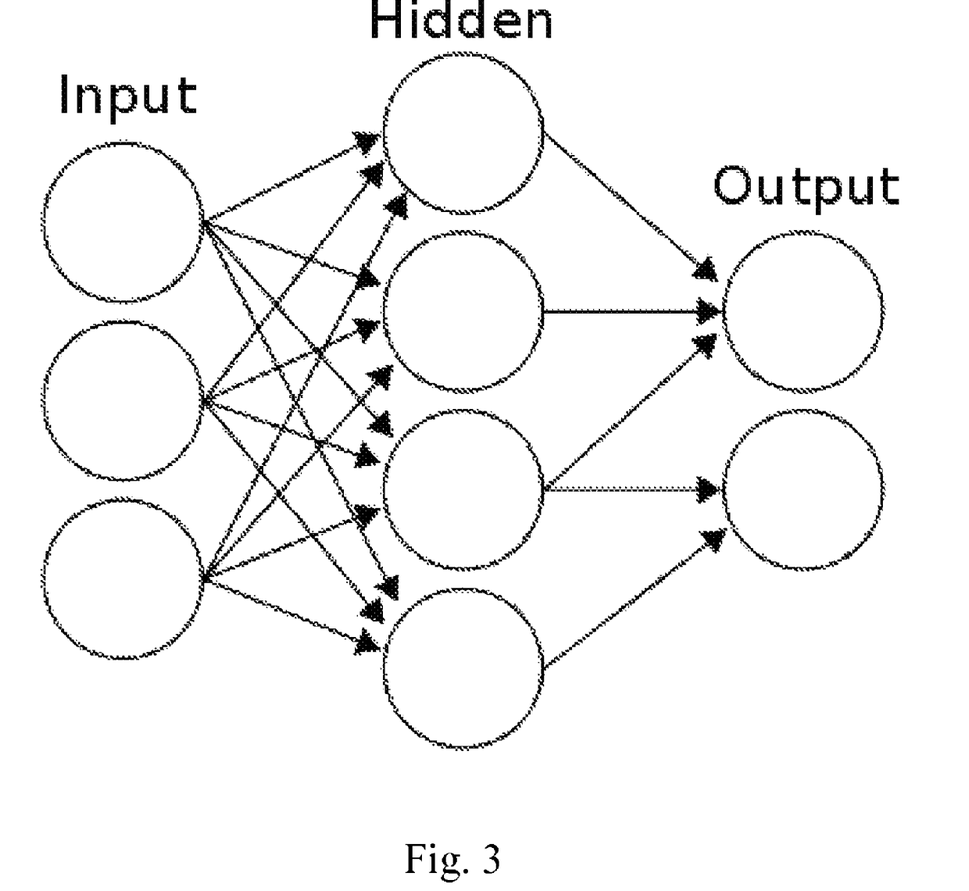
FIG. 3 is a schematic illustration of an example embodiment of a three layer neural network.

A "neural network" is an interconnected group of nodes. FIG. 3 shows a three layer neural network. The first layer is the input later and the final layer is the output layer. Between the input and the output layer is a hidden layer. Optionally, there could be a plurality of hidden layers as desired. Inputs are given to the input layers from the external world. The neuron at the input layer makes a weighted sum and by using a transfer function, the neuron propagates the weighted sum to the next level of neurons.

An "artificial neural network" is a mathematical model or computational model that tries to simulate the structure and/or functional aspects of biological neural networks. Artificial neural networks can be made up of interconnecting artificial neurons (programming constructs that mimic the properties of biological neurons). Artificial neural networks may be used to model complex relationships between inputs and outputs, to find patterns in data, to gain an understanding of biological neural networks, or for solving artificial intelligence problems without necessarily creating a model of a real biological system.

Within such artificial neural networks, there are different learning paradigms, each corresponding to a particular abstract learning task. These are supervised learning, unsupervised learning and reinforcement learning. There are a number of algorithms for training artificial neural networks. These algorithms may be viewed as an application of optimization theory and statistical estimation. Back propagation is an example of one such algorithm.

Back propagation, or propagation of error, is a method of teaching artificial neural networks how to perform a given task. It is a supervised learning method, and is an implementation of the Delta rule. The algorithm relies on a teacher that knows, or can calculate, the desired output for any given input. The back propagation method is typically used for feed-forward networks (networks that have no feedback, or simply, that have no connections that loop).

Back propagation networks may be multilayer perceptions (a binary classifier that maps its input x (a real-valued vector) to an output value f(x) (a single binary value) across the matrix), usually with one input, one hidden, and one output layer. Multilayer networks typically have non-linear activation functions for the multiple layers. This is because a multilayer network using only linear activation functions is equivalent to a single layer, linear network. Non-linear activation functions that may be used include, but are not limited to, the logistic function, the softmax function, and the Gaussian function.

Figure 4:
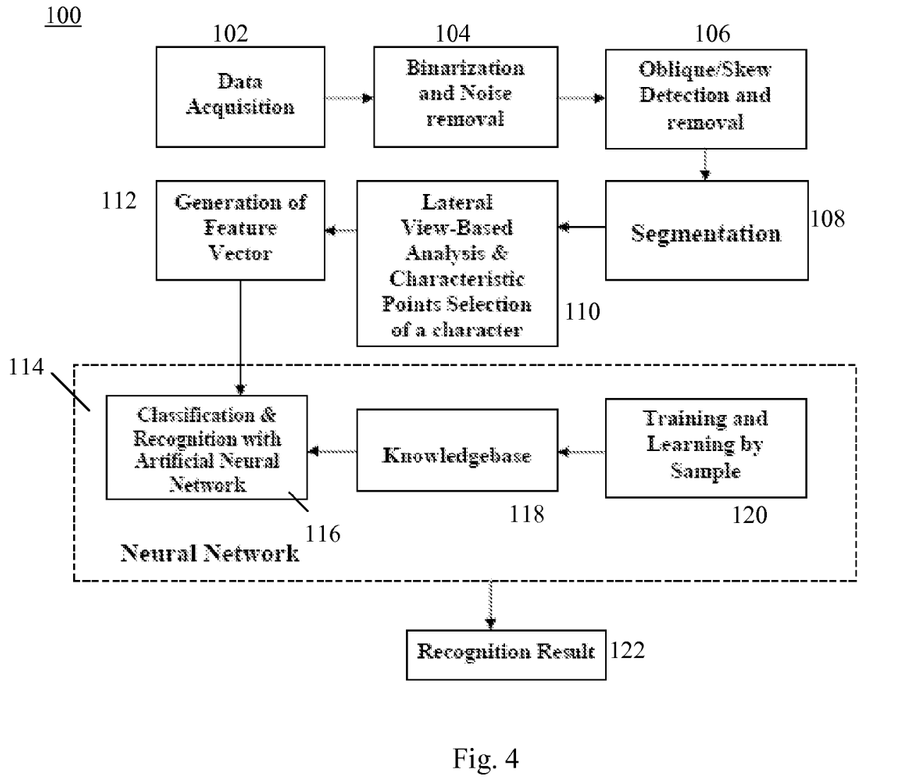
FIG. 4 is a block diagram illustrating an embodiment of an example system and method.

A block diagram of an example system and method 100 is shown in FIG. 4. In this embodiment, lateral view based character recognition includes of the steps of i) data acquisition 102, ii) text binarization and noise removal 104, iii) oblique/skew detection and removal 106, iv) segmentation 108, v) lateral view-based analysis and characteristic points selection of a character 110, vi) generation of a feature vector 112, and vii) classification and recognition 116 with an Artificial Neural Network 114. The Artificial Neural Network 114 includes training 120, a knowledge base 118, and classification (pattern recognition) 116. The output is text recognition 122. Other embodiments may include fewer steps or additional steps. For example, if an electronic copy of the text to be recognized is received, then the step of data acquisition 102 by scanning may be omitted. Similarly, if the original text is black and white, binarization 104 may be omitted. If the original is clean, (i.e., relatively noise free), noise removal may be omitted 104. Segmentation 108 may, in some situations (for example analysis of a single character), be omitted. Optional steps that may be added include, for example, thinning.

Data acquisition 102: In an embodiment, the data may be acquired 102 by being scanned by a scanning device, such as but not limited to flatbed, photo, handheld, digital camera, charged-coupled devices (CCDs), and contact image sensors (CIS). The scanned data may then be stored in digital image format. Alternatively, the data may be stored in an analog format and converted to a digital format later. The data may be digitized and stored, for example, using a histogram threshold technique. In the histogram threshold technique, individual pixels in an image are marked as "object" pixels if their value is greater than some threshold value (assuming an object to be brighter than the background) and as "background" pixels otherwise. Other digital algorithms may also be used. Data may also be acquired by typing characters using a text editor that supports the language/script and then taking an image of the characters.

Binarization and Noise removal 104: Binarization 104 is the process of converting a scanned image having multiple colors (e.g., grey scale to full color) to a black-and-white format. The color of an image may have no special significance for character recognition. Therefore, in an embodiment, if the scanned image includes color, the scanned image may be converted into a binary (black and white) Image. Standard algorithms for binarization can be used for this purpose.

Otsu's method is an example image binarization method 104 that may be used to perform histogram shape-based image thresholding or, the reduction of a gray-level image to a binary image. The algorithm assumes that the image to be binarized (thresholded) contains two classes of pixels (e.g. foreground and background). The algorithm calculates the optimum threshold separating those two classes so that their combined spread (intra-class variance) is minimal.

In Otsu's method, the threshold that minimizes the intra-class variance is first determined. The intra-class variance may be defined as a weighted sum of variances of the two classes:

$$\sigma_\omega^2(t) = \omega_1(t)\sigma_1^2(t) + \omega_2(t)\sigma_2^2(t) \tag{1}$$

Where weights $\omega_i$ are the probabilities of the two classes separated by a threshold t and $\sigma_i^2$ are the variances of these classes.

The Otsu method illustrates that minimizing the intra-class variance is the same as maximizing the inter-class variance:

$$\sigma_b^2(t) = \sigma^2 - \sigma_\omega^2(t) = \omega_1(t)\omega_2(t)[\mu_1(t)-\mu_2(t)]^2 \tag{2}$$

Where the inter-class variance is expressed in terms of class probabilities $\omega_i$ and class means $\mu_i$, which in turn can be updated iteratively. Otsu's method may be used by: (1) computing histogram and probabilities of each intensity level, (2) setting up the initial $\omega_i(O)$ and $\mu_i(O)$, (3) stepping through the thresholds t=1 ... maximum intensity, (a) updating $\omega_i$ and $\mu_i$, (b) computing $\sigma_b^2(t)$, and (4) determining the threshold corresponding to the maximum $\sigma_b^2(t)$. Binarization may also be accomplished with a histogram threshold technique.

Example data sources for character recognition include printed or hand written text; these data sources are susceptible to noise. Noise may include, but is not limited to, smudges, spots, dirt, and other artifacts which are not intended to be part of the character data. Noisy data can affect the final recognition process. For example, noise, may cause the system to choose an incorrect point as the characteristic point for the step of lateral analysis discussed below. There are some standard methods for removing noise 104. For example, a Wiener Filter (using constant ratio/using auto correlation function) may be used to remove blurred noise from the image. Spatial filters like harmonic mean/contra harmonic mean etc may also be used. Various noise types like pepper/salt noise can be removed by applying the max/min filters. Noise removal is an overhead on character recognition processing. Thus, in some embodiments, noise is removed 104 from the image before further processing the image.

Oblique/skew detection and removal 106: When scanning a paper document to convert it to an electronic form with digitizing devices (e.g., a scanner), the paper may be subject to a small tilt or skew. A de-skewed document, however, generally results in a more compact representation of its components. Typically, the text and pictorial objects of a de-skewed document may be more clearly marked and identified by rectilinear bounding boxes. This may be particularly true for text objects, such as a paragraph of text, lines, words etc. A de-skewed document typically results in more efficient, robust, and simpler algorithms for document image analysis such as optical character recognition (OCR).

Segmentation 108: In an embodiment, the text is segmented into individual characters. Improper character segmentation may produce incorrect characteristic points, leading to a wrong feature vector. In an embodiment, if the input document contains a multi-line text consisting of a number of words and characters, the system first segments the text to extract the individual lines. In a next step, the lines may be segmented into different words. At a next step of the segmentation process, individual characters may be segmented from the words.

Figure 9:
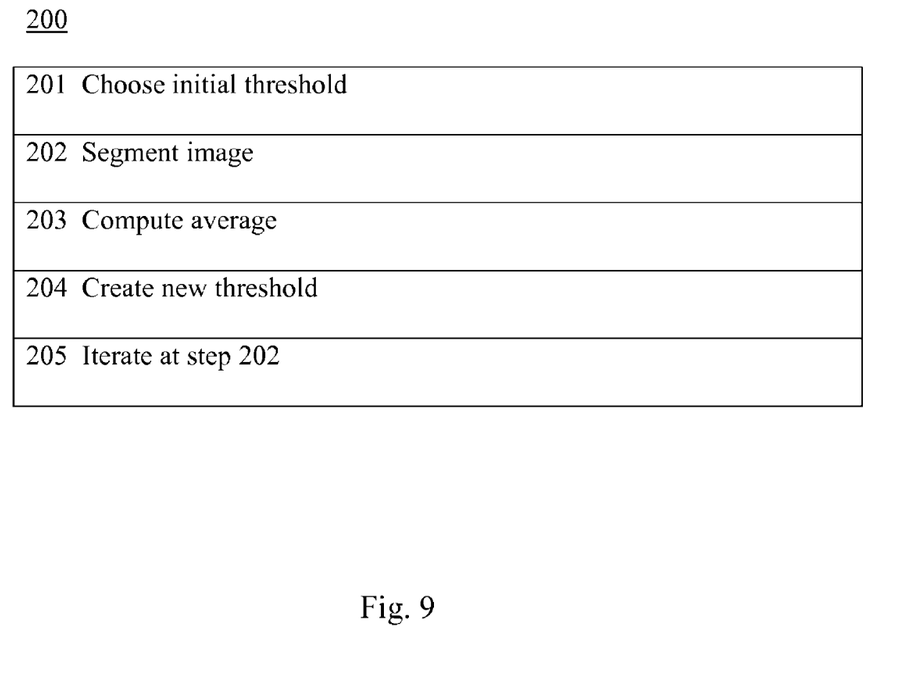
FIG. 9 shows a processing flow for an iterative histogram method, in accordance with at least some embodiments described herein.

Thresholding is a simple example method of image segmentation. From a grayscale image, thresholding can be used to create binary image. A histogram of the image pixel intensities may be created and the valley point used as the threshold. The histogram approach assumes that there is some average value for the background and object pixels, but that the actual pixel values have some variation around these average values. The histogram approach may be computationally expensive. Additionally, some image histograms may not have clearly defined valley points, often making the selection of an accurate threshold difficult. A variation 200 of the histogram method that is relatively simple, does not require much specific knowledge of the image, and is robust against image noise, illustrated in FIG. 9, is the following iterative method:

201. An initial threshold (T) is chosen, this can be done randomly or according to any other method desired.

202. The image is segmented into object and background pixels as described above, creating two sets:
   (2.1) $G_1=\{f(m,n):f(m,n)>T\}$ (object pixels)
   (2.2) $G_2=\{f(m,n):f(m,n)<T\}$ (background pixels) (note, $f(m,n)$ is the value of the pixel located in the $m^{th}$ column, $n^{th}$ row)

203. The average of each set is computed.
   1. $m_1$=average value of $G_1$
   2. $m_2$=average value of $G_2$ 204. A new threshold is created that is the average of $m_1$ and $m_2$
   (4.1) $T'=(m_1+m_2)/2$ 205. Return to step two, now using the new threshold computed in step four, keep repeating until the new threshold matches the one before it (i.e. until convergence has been reached).

Lateral-View-based Analysis and Characteristics Points Selection 110: The lateral view approach is based on the idea that the left and right contours of a character provide information that can be used to recognize the character. In an embodiment, two "views" (left and right) of each letter are examined to determine a characteristic feature vector which describes the given letter. In an embodiment, the views include pixels belonging to the contour of a letter and having extreme values of x coordinate—minimal for the left view and maximal for the right view (considering the image to be represented in the first quadrant of a Cartesian coordinate system). That is, the origin of the Cartesian coordinate is set at the lower left of the bounding box of the letter. In alternative embodiments, the origin may be set such that the letter is located in any of the other three Cartesian quadrants.

Figure 5:
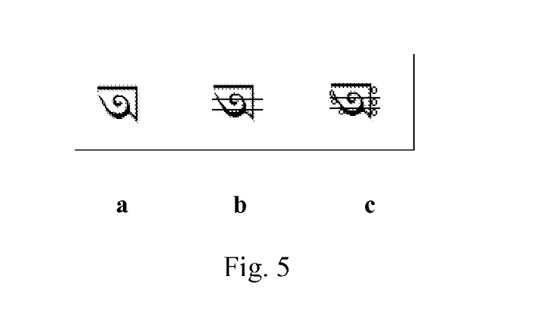
FIG. 5 illustrates (a) the Bengali letter "Auo" with matra on top of it, (b) the same letter having three logical horizontal segments, and (c) the same letter with characteristic points shown in each segment.

Characteristic points may be extracted from the lateral views of the character (left and right views of individual letters). In an example, an embodiment is illustrated in FIG. 5 with a letter of Bengali language. In this example, the character is a simple character. Compound characters, however, may also be recognized as described in more detail below considered. In an embodiment, computation time is reduced relative to conventional methods that use almost every pixel of the character. In this embodiment there is no need to use a brute force matching process that compares each and every pixel of the image of the letter being evaluated with the corresponding pixel of another image in a pre-stored database. In this method, typically only a few points (from left and right contours/boundaries of the letter) are selected to form a set of characteristic points that describe the character/letter.

In an embodiment, characteristic points are marked out on the surface of the left and right views to describe the shape of those views. The method of selecting these points and their amount may vary. Typically, the number of points is selected which results in a desired threshold accuracy of character recognition. In an embodiment, the more points that are selected, the greater the accuracy. However, the selection of more points results in greater computation and slower text recognition. Thus, for example, the number of points used for a mobile device in which fast results are desired may be lower than the number of points used for scholarly research where high recognition accuracy is required.

To find the characteristic points of a character in one embodiment, the image of the letter may be divided horizontally into a number of identical segments equal to the number of points to be considered for processing (FIG. 5*b*). In other embodiments, the segments are not identical. For example, if it is known that a particular language has more distinctive features in a lower portion of the characters than in higher portions, than the segment sizes may be selected such that there are more characteristic points generated in the lower portion of the characters.

Next, the position from the Y-axis of the nearest (left view) and furthest (right view) points on the left and right contours of the character in each segment is identified. In this manner, the characteristic point for each segment for both the left and right views is determined (FIG. 5*c*). The two sets representing these characteristic points may be denoted as follows. The points taken from the left view form the set Plv={(x1,y1), (x2,y2),(x3,y3)}. The points taken from the right view form the set Prv={(x'1,y'1), (x'2,y'2),(x'3,y'3)}.

As shown in FIG. 5, the letter "Auo" has been divided into three partitions (FIG. 5*b*). As discussed above, more or fewer partitions may be selected depending on the complexity of the characters and the desired accuracy. In this embodiment, one characteristic point is selected for each partition for both left and right views. Alternatively, more than one point may be selected for one or more of the partitions. From the three selected points, two 3-element vectors describing the given letter may be generated:

$$V\text{left}=\{x1,x2,x3\}; \text{ and } V\text{right}=\{x'1,x'2,x'3\} \quad (3)$$

Next, these two vectors together with two values describing the aspect ratio of the picture (width, w by height, h) are transformed into a single 8-element feature vector of the corresponding character. The aspect ratio may be used to normalize the characters so that the same character with different aspect ratio may be recognized without use of multiple reference vectors for each character. In this manner, different documents having different font sizes may all be recognized with the same reference vectors. Indeed, this embodiment may be used for example, with texts with different character sizes, such as newspapers that include headlines or a document that includes headers.

$$FV=\{x1,x'1,x2,x'2,x3,x'3,w,h\}. \quad (4)$$

In the feature vector, the x-coordinates of the points have been ordered segment wise, followed by the aspect ration. The first element of this vector is the x-coordinate of the characteristic point in the first horizontal segment for the left view. The second element in the vector is the x-coordinate of the characteristic point in the first segment for the right view, etc. The ordering of the elements within the feature vector, however, is arbitrary. That is, for an embodiment, any order may be selected.

Classification with Artificial Neural Network 114: In an embodiment, an artificial neural network may be used as the classifier (recognizer). Artificial Neural Networks 114 have been found to perform well as a classifier in connection to optical character recognition. Artificial Neural Networks 114 are developed by training 120 to develop a knowledge base 118 which is used for classification (pattern recognition) 116.

Handling Compound Characters

Figure 6:
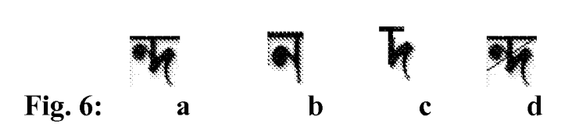
FIG. 6 is a schematic illustration of an embodiment of an example method for recognition of a compound character in which (a) is the compound character, (b) a first simple character, (c) a second simple character, and (d) the compound character with a divider to distinguish the simple characters.

A compound character is a character which comprises two or more simple characters. FIG. 6*a* illustrates an example of a compound character in Bengali. FIGS. 6*b* and 6*c* illustrate the two component characters forming the compound character of FIG. 6a. One approach to deal with these types of compound characters is to diagonally segment the character into two parts as shown in FIG. 6d and identify the component characters individually. Then the compound character may be recognized from the individual component characters.

Figure 7:
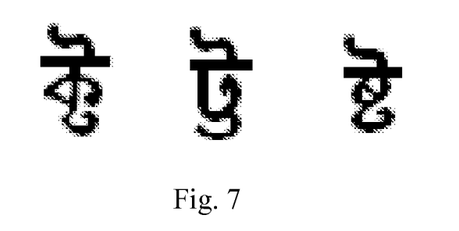
FIG. 7 illustrates three compound characters from the Bengali language.

In an embodiment, recognition may be accomplished without diagonal segmentation. The contours of such compound characters typically have a characteristic pattern. Examples of three compound characters in Bengali are illustrated in FIG. 7. Because these compound characters have different contours, they can therefore be identified by view-based analysis without diagonal segmentation. This saves the computation time required for the diagonal segmentation.

In conventional character recognition algorithms, the computation is done on scanned images stored in some format. In an embodiment of the proposed lateral view based approach, computation is done on the identified feature vector, rather than the entire image. Thus, the feature vector of the characters to be recognized may be stored rather than the whole picture/image or a thinned version of the image. This reduces the use of storage and tends to speed up the process of character recognition. In an embodiment, the lateral view based approach may be used for languages/scripts that contain a horizontal line like "Matra" on top of the characters in word, e.g. Devanagri, Hindi, and Bengali. A top-bottom view based approach may not properly classify such characters as the top view is same for a large number of characters for such languages. Further, the lateral view methodology is good for classification of the compound characters used in these languages.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed:

1. A method comprising:
   receiving, by a computing device, character data comprising one or more characters, the one or more characters having a first contour and a second contour;
   performing, by the computing device, lateral view analysis on the character data;
   generating, by the computing device, a feature vector based on the lateral view analysis; and
   identifying, by the computing device, the one or more characters.

2. The method of claim 1, wherein the computing device comprises a data acquisition device.

3. The method of claim 1, further comprising binarizing, by the computing device, the character data.

4. The method of claim 1, further comprising removing, by the computing device, noise from the character data.

5. The method of claim 1, further comprising performing, by the computing device, oblique/skew detection.

6. The method of claim 1, further comprising segmenting, by the computing device, the character data into individual characters.

7. The method of claim 1, further comprising identifying, by the computing device, the one or more characters using an artificial neural network.

8. The method of claim 1, wherein the computing device comprises an artificial neural network.

9. The method of claim 1, wherein the performing lateral view analysis comprises:
   selecting, by the computing device, a number of characteristic points;
   dividing, by the computing device, the one or more characters into a number of horizontal segments, the number of segments equal to the number of characteristic points; and
   locating, by the computing device, characteristic points on the first and second contours,
   wherein a characteristic point is located in each segment on both the first and second contours.

10. The method of claim 9, wherein the one or more characters comprises an origin located at a lower left of the one or more characters and wherein the characteristic points on the first contour are located at a minimum distance from a vertical axis rising from the origin and the characteristic points on the second contour are located at a maximum distance from the vertical axis.

11. The method of claim 9, wherein the horizontal segments have the same height.

12. The method of claim 1, wherein the characters are cursive characters.

13. The method of claim 1, wherein the characters are compound characters.

14. A system comprising:
   a data acquisition device configured to acquire character data comprising one or more characters, the one or more characters having a first contour and a second contour; and
   a computing device configured to:
   perform lateral view analysis on the character data, the lateral view analysis comprising locating characteristic points on the first and second contours, wherein a characteristic point is located in each segment on the first contour and the second contour;
   generate a feature vector based on the lateral view analysis; and
   identify the one or more characters.

15. The system of claim 14, wherein the performing lateral view analysis further comprises:
   selecting a number of the characteristic points; and
   dividing the one or more characters into a number of horizontal segments, the number of segments equal to the number of characteristic points.

16. The system of claim 14, wherein the computing device is further configured to segment the character data into individual characters.

17. The system of claim 14, wherein the computing device is further configured to identify the one or more characters using an artificial neural network.

18. The system of claim 14, wherein the computing device is coupled to an artificial neural network.

19. The system of claim 14, wherein the computing device is further configured to:
   binarize the character data;
   remove noise from the character data; and
   perform oblique/skew detection.

20. The system of claim 14, wherein the one or more characters comprises an origin located at a lower left of the one or more characters and wherein the characteristic points on the first contour are located at a minimum distance from a vertical axis rising from the origin and the characteristic points on the second contour are located at a maximum distance from the vertical axis.

* * * * *